United States Patent
Griffin et al.

(10) Patent No.: US 12,294,498 B2
(45) Date of Patent: May 6, 2025

(54) REAL TIME QUBIT ALLOCATION FOR DYNAMIC NETWORK TOPOGRAPHIES

(71) Applicant: Red Hat, Inc., Raleigh, NC (US)

(72) Inventors: Leigh Griffin, Waterford (IE); Stephen Coady, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 474 days.

(21) Appl. No.: 17/871,365

(22) Filed: Jul. 22, 2022

(65) Prior Publication Data

US 2024/0031238 A1 Jan. 25, 2024

(51) Int. Cl.
*H04L 41/12* (2022.01)
*H04B 10/70* (2013.01)

(52) U.S. Cl.
CPC .............. *H04L 41/12* (2013.01); *H04B 10/70* (2013.01)

(58) Field of Classification Search
CPC .............................. H04L 41/12; H04B 10/70
See application file for complete search history.

(56) References Cited

U.S. PATENT DOCUMENTS

| | | | |
|---|---|---|---|
| 11,010,145 B1 | 5/2021 | Smith et al. | |
| 11,245,584 B2 | 2/2022 | Griffin et al. | |
| 11,922,107 B2* | 3/2024 | Gutierrez | G06N 10/00 |
| 2011/0295227 A1 | 12/2011 | Hawkins et al. | |
| 2021/0166148 A1 | 6/2021 | Matsuura et al. | |
| 2022/0027323 A1 | 1/2022 | Coady et al. | |
| 2022/0084085 A1* | 3/2022 | Rigetti | H04M 15/8214 |
| 2022/0222412 A1* | 7/2022 | Huffman | G06F 30/31 |
| 2022/0391741 A1* | 12/2022 | McMahon | G06N 10/40 |
| 2023/0155689 A1* | 5/2023 | Djordjevic | H04B 10/118 398/121 |
| 2024/0005190 A1* | 1/2024 | Kong | G06N 10/20 |
| 2024/0031224 A1* | 1/2024 | Stockert | H04L 41/0816 |

FOREIGN PATENT DOCUMENTS

CN 113472452 A * 10/2021

OTHER PUBLICATIONS

English translation for CN_113472452_A_I (Year: 2021).*
Fu, X. et al., "eQASM: An Executable Quantum Instruction Set Architecture," Proceedings of the 25th International Symposium on High-Performance Computer Architecture (HPCA'19), arXiv:1808.02449v3 [cs.AR], Mar. 9, 2019, 11 pages.
Shadbolt, P.J. et al., "Generating, manipulating and measuring entanglement and mixture with a recongurable photonic circuit," Nature Photon 6, 45-49 (2012), https://doi.org/10.1038/nphoton.2011.283, Dec. 11, 2011, 7 pages.

* cited by examiner

*Primary Examiner* — Chi H Pham
*Assistant Examiner* — Weibin Huang
(74) *Attorney, Agent, or Firm* — Dority & Manning, P.A.

(57) ABSTRACT

Qubit allocation for dynamic network topographies is disclosed. In one example, a processor device of a computing system implements a configuration to quantum definition (C2Q) service that performs real time qubit allocation for dynamic network topographies. The C2Q service can ensure synchronization between a configuration file for a network topography and a quantum definition file for qubits allocated to the network topography.

20 Claims, 6 Drawing Sheets

REAL TIME QUBIT ALLOCATION FOR DYNAMIC NETWORK TOPOGRAPHIES

BACKGROUND

Quantum computing involves the use of quantum bits, referred to herein as "qubits," which have characteristics that differ from those of classical (i.e., non-quantum) bits used in classical computing. Qubits may be employed by quantum services that are executed by quantum computing devices. As quantum computing continues to increase in popularity and become more commonplace, an ability to efficiently and accurately allocate qubits in real time will be desirable.

SUMMARY

The examples disclosed herein implement a configuration to quantum definition (C2Q) service that performs real time qubit allocation for dynamic network topographies. In particular, the C2Q service can quickly identify and address changes in a configuration file for a dynamically changing network topography. The C2Q service can respond to the changes by updating a corresponding quantum definition file for the network topography. The C2Q service can cause adherence to the updated quantum definition file.

In one example, a method for qubit allocation for dynamic network topographies is disclosed. The method comprises maintaining, by a computing device, a mapping table that respectively maps a plurality of nodes in a network topology to a plurality of allocated qubits allocated to perform quantum computation for the network topology. The method comprises receiving, by the computing device, a configuration file for the network topology, wherein the configuration file reflects one or more changes to the network topology. The method comprises generating, by the computing device, an updated quantum definition file for the network topology based on the configuration file and the mapping table, wherein the updated quantum definition file comprises one or more additional allocations of one or more additional qubits or one or more deallocations of one of more of the plurality of allocated qubits. The method comprises causing, by the computing device, the one or more additional allocations of the one or more additional qubits or the one or more deallocations of the one of more of the plurality of allocated qubits according to the updated quantum definition file.

In another example, a quantum computing device for qubit allocation for dynamic network topographies is disclosed. The quantum computing device comprises a system memory, and a processor device communicatively coupled to the system memory. The processor device is to maintain a mapping table that respectively maps a plurality of nodes in a network topology to a plurality of allocated qubits allocated to perform quantum computation for the network topology. The processor device is to receive a configuration file for the network topology, wherein the configuration file reflects one or more changes to the network topology. The processor device is to generate an updated quantum definition file for the network topology based on the configuration file and the mapping table, wherein the updated quantum definition file comprises one or more additional allocations of one or more additional qubits or one or more deallocations of one of more of the plurality of allocated qubits. The processor device is to cause the one or more additional allocations of the one or more additional qubits or the one or more deallocations of the one of more of the plurality of allocated qubits according to the updated quantum definition file.

In another example, a non-transitory computer-readable medium is disclosed. The non-transitory computer-readable medium stores thereon computer-executable instructions that, when executed, cause one or more processor devices to maintain a mapping table that respectively maps a plurality of nodes in a network topology to a plurality of allocated qubits allocated to perform quantum computation for the network topology. The computer-executable instructions cause the one or more processors to receive a configuration file for the network topology, wherein the configuration file reflects one or more changes to the network topology. The computer-executable instructions cause the one or more processors to generate an updated quantum definition file for the network topology based on the configuration file and the mapping table, wherein the updated quantum definition file comprises one or more additional allocations of one or more additional qubits or one or more deallocations of one of more of the plurality of allocated qubits. The computer-executable instructions cause the one or more processors to cause the one or more additional allocations of the one or more additional qubits or the one or more deallocations of the one of more of the plurality of allocated qubits according to the updated quantum definition file.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
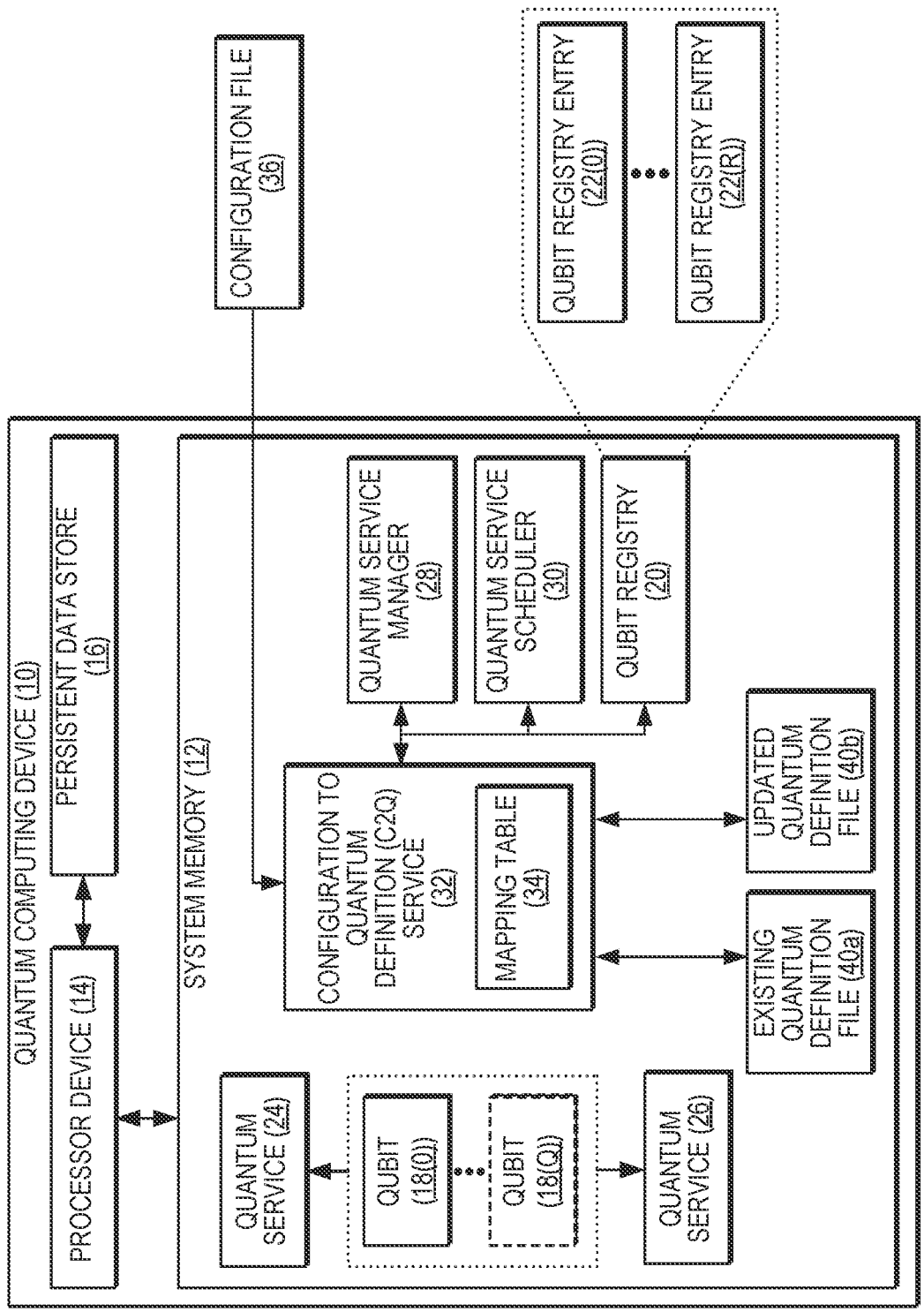
FIG. 1 is a block diagram of a computing system in which examples may be practiced.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first executing quantum service" and "second executing quantum service," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Quantum computing involves the use of quantum bits, referred to herein as "qubits," which have characteristics that differ from those of classical (i.e., non-quantum) bits used in classical computing. Qubits may be employed by quantum services that are executed by quantum computing devices.

In some example settings, qubits of a quantum service can be allocated to perform quantum computations on behalf of a network (e.g., a network of classical computers) that has a network topology including a plurality of nodes (e.g., computing devices). In some examples, qubits can be allocated in a manner in which each allocated qubit corresponds to a respective one of the nodes in the network topology. For example, a quantum definition file (e.g., written in a quantum assembly language) may specify a quantum program (e.g., quantum circuit) that is executed by and with a number of qubits. For example, a quantum definition file may specify an arrangement of qubits that corresponds to the network topography.

However, in some example networks such as the examples given above, the network topology may be highly dynamic or transient in nature, with nodes frequently joining and leaving the network. Thus, in such settings, a quantum definition file may quickly become outdated or otherwise fail to reflect the current state of the network topography. Thus, an ability to manage qubit allocation quickly and accurately on behalf of dynamic network topographies will be desirable.

The examples disclosed herein implement a configuration to quantum definition (C2Q) service that performs real time qubit allocation for dynamic network topographies. The C2Q service can ensure synchronization between a configuration file for a network topography and a quantum definition file for qubits allocated to the network topography.

Specifically, the C2Q can maintain a mapping table that respectively maps a plurality of nodes in a network topology to a plurality of allocated qubits allocated to perform quantum computation for the network topology. For example, the network can be an Internet of Things (IoT) network, a network of mobile devices (e.g., cellular telephones), a network of embedded devices, a mesh network, and/or other networks. The plurality of allocated qubits can perform quantum computations on behalf of the network topology. The quantum computations can include just in time optimizations such as energy minimization route optimization or combinatorial route analysis.

The C2Q can access and evaluate a configuration file that describes nodes within a network topology of a network. The configuration file can include information (e.g., metadata) about each node such as neighbors, capabilities, access requests, etc. In some examples, the configuration file can be structured as or include a graph representation of the network topology.

The C2Q can detect or observe changes in the configuration file. For example, the changes in the configuration file can correspond to nodes leaving or entering the network. In some examples, the C2Q can actively monitor the configuration file to detect the changes. The C2Q can operate to address the changes within the configuration file by updating a corresponding quantum definition file based on the changes to the configuration file and the mapping table.

Specifically, in response to the changes within the configuration file, the C2Q service can generate an updated quantum definition file for the network topology. As one example, the updated quantum definition file can be a Quantum Assembly Language (QASM) file. The updated quantum definition file can include one or more additional allocations of one or more additional qubits and/or one or more deallocations of one of more of the qubits that are currently allocated to the network topography.

The C2Q service can cause the one or more additional allocations of the one or more additional qubits and/or the one or more deallocations of the one of more allocated qubits according to the updated quantum definition file. As examples, the C2Q service can communicate with a qubit registry, a quantum service manager, and/or a quantum service scheduler to cause the updated quantum definition file to be executed by a quantum computing system.

In such fashion, the C2Q service can quickly identify and address changes in the configuration file for a dynamically changing network topography. The C2Q service can respond by modifying and then causing adherence to a corresponding quantum definition file.

FIG. 1 is a block diagram of a quantum computing device 10 that comprises a system memory 12 and a processor device 14. The quantum computing device 10 further comprises a persistent data store 16 (e.g., a hard drive or Solid State Drive (SSD), as non-limiting examples). It is to be understood that the quantum computing device 10 in some examples may include constituent elements in addition to those illustrated in FIG. 1. The quantum computing device 10 operates in quantum environments but is capable of operating using classical computing principles or quantum computing principles. Thus, in some implementations, portions of the quantum computing device 10 (e.g., the configuration to quantum definition (C2Q) Service 32 described further herein) may be executed using classical computing components and/or algorithms.

When using quantum computing principles, the quantum computing device 10 performs computations that utilize quantum-mechanical phenomena, such as superposition and/or entanglement states. The quantum computing device 10 may operate under certain environmental conditions, such as at or near zero degrees (0°) Kelvin. When using classical computing principles, the quantum computing device 10 utilizes binary digits that have a value of either zero (0) or one (1).

In the example of FIG. 1, the quantum computing device 10 implements a set of one or more qubits 18(0)-18(Q) for use by quantum services executed by the quantum computing device 10. To maintain information for the qubit(s) 18(0)-18(Q), the quantum computing device 10 includes a qubit registry 20, which comprises a plurality of qubit registry entries 22(0)-22(R) each corresponding to a qubit such as the one or more qubits 18(0)-18(Q). The qubit registry 20 maintains and provides access to data relating to the qubits implemented by the quantum computing device 10, such as a count of the total number of qubits implemented by the quantum computing device 10 and a count of the number of available qubits that are currently available for allocation, as non-limiting examples. Each of the qubit registry entries 22(0)-22(R) of the qubit registry 20 also stores qubit metadata (not shown) for a corresponding qubit. The qubit metadata may include, as non-limiting examples, an identifier of the corresponding qubit, an availability indicator that indicates whether the corresponding qubit is available for use or is in use by a specific quantum service, an identifier of a quantum service that is associated with the corresponding qubit or to which the corresponding qubit is allocated, and/or an quantum phenomena indicator that indicates whether the corresponding qubit is in an entangled state and/or a superposition state.

The quantum computing device 10 of FIG. 1 executes one or more quantum services, such as the quantum service 24 and the quantum service 26. The quantum service 24 and the quantum service 26 are processes that employ qubits such as the one or more qubits 18(0)-18(Q) to provide desired functionality. Execution of quantum services such as the quantum service 24 and the quantum service 26 is facilitated by a quantum service manager 28 and a quantum service scheduler 30. The quantum service manager 28 of the quantum computing device 10 handles operations for creating, monitoring, and terminating quantum services, while the quantum service scheduler 30 of the quantum computing device 10 controls the scheduling of quantum services for execution by the processor device 14, and allocation of processing resources to executing quantum services. The functionality of the quantum service manager 28 and the quantum service scheduler 30 may be made accessible to other processes (e.g., via a defined application programming interface (API), as a non-limiting example).

The quantum computing device 10 of FIG. 1 implements a configuration to quantum definition (C2Q) service 32 that performs real time qubit allocation for dynamic network topographies. The C2Q service 32 can ensure synchronization between a configuration file 36 for a network topography and a quantum definition file 40a for qubits allocated to the network topography.

Specifically, the C2Q service 32 can maintain a mapping table 34 that respectively maps a plurality of nodes in a network topology to a plurality of allocated qubits allocated to perform quantum computation for the network topology. For example, the mapping table 34 can map the nodes from the configuration file 36 to the qubits that have been allocated to the network topology as specified in the quantum definition file 40a. As examples, the network associated with the configuration file 36 can be an Internet of Things (IoT) network, a network of mobile devices (e.g., cellular telephones), a network of embedded devices, a mesh network, and/or other networks. The plurality of allocated qubits can perform quantum computations on behalf of the network topology. The quantum computations can include just in time optimizations such as energy minimization route optimization or combinatorial route analysis.

The C2Q service 32 can access and evaluate a configuration file 36 that describes nodes within a network topology of a network. The configuration file can include information (e.g., metadata) about each node such as neighbors, capabilities, access requests, etc. In some examples, the configuration file can be structured as or include a graph representation of the network topology.

The C2Q service 32 can detect or observe changes in the configuration file 36. As examples, the changes in the configuration file 36 can correspond to nodes leaving or entering the network. In some examples, the C2Q service 32 can actively monitor the configuration file 36 to detect the changes. For example, the C2Q service 32 can store a copy of the current configuration file 36 and monitor for changes in the master configuration file 36, for example, by performing a simple difference operation on the files. Taking this difference, the C2Q service 32 can consult the mapping table 34 and identify any nodes that are no longer needed (e.g., nodes that have left the network) and identify any nodes that do not have a corresponding qubit in the mapping table 34 (e.g., because the node has newly entered the network). The C2Q service 32 can operate to address the changes within the configuration file 36 by updating a corresponding quantum definition file based on the changes to the configuration file 36 and the mapping table 34. For example, updating the corresponding quantum definition file can include replacing the existing quantum definition file 40a with an updated quantum definition file 40b.

Specifically, in response to the changes within the configuration file 36, the C2Q service 32 can generate an updated quantum definition file 40b for the network topology. The quantum definition files 40a and 40b can contain quantum programming instructions that define content and configuration of the quantum service 24. In such examples, the C2Q service 32 may re-allocate the one or more qubits 18(0)-18(Q) for the executing quantum service 24 by generating the updated quantum definition file 40b for the executing quantum service 24 to identify the one or more qubits 18(0)-18(Q). As one example, the quantum definition files 40a and 40b can be Quantum Assembly Language (QASM) files. Thus, the updated quantum definition file 40b can include one or more additional allocations of one or more additional qubits and/or one or more deallocations of one of more of the qubits that are currently allocated to the network topography (e.g., relative to existing quantum definition file 40a).

In some implementations, to generate the updated quantum definition file 40b, the C2Q service 32 can clone the existing quantum definition file 40a for the network topology to generate a cloned quantum definition file. The C2Q service 32 can then edit the cloned quantum definition file to generate the updated quantum definition file 40b. For example, in some implementations, the C2Q service 32 can consult the qubit registry 20 and lock down new qubits to allocate and assign to the new nodes. The C2Q service 32 can also flag qubits that are no longer needed, and the qubit registry 20 can mark them, for example by modifying their metadata, to be safely deallocated at the appropriate time. Having retrieved the appropriate information from the qubit registry 20, the C2Q service 32 can edit the cloned quantum definition file to contain the appropriate references. For example, the C2Q service 32 can insert references to new qubits (e.g., their address(es) and metadata from the qubit registry 20) and remove lines associated with qubits that are no longer needed, thereby generating the updated quantum definition file 40b.

The C2Q service 32 can cause the one or more additional allocations of the one or more additional qubits and/or the one or more deallocations of the one of more allocated qubits according to the updated quantum definition file 40b. As examples, the C2Q service 32 can communicate with the qubit registry 20, the quantum service manager 28, and/or the quantum service scheduler 30 to cause the updated quantum definition file 40b to be executed by the quantum computing device 10 (e.g., to be executed by quantum service 24).

In some implementations, to cause the one or more additional allocations or the one or more deallocations, the C2Q service 32 can determine an quantum phenomena state of the existing quantum definition file 40a for the network topology. The quantum phenomena state of the existing quantum definition file 40a can indicate whether the qubits specified in the existing quantum definition file 40a are currently engaged in quantum phenomena, such as superposition and/or entanglement. The C2Q service 32 can cause the one or more additional allocations or the one or more deallocations based on the quantum phenomena state of the existing quantum definition file 40a.

As one example, in response to determining that the quantum phenomena state of the existing quantum definition file 40a comprises a non-phenomena state, the C2Q service 32 can perform hot-swapping of the existing quantum definition file 40a with the updated quantum definition file 40b. For example, the qubits can be allocated and/or deallocated while the quantum service 24 is executing the existing quantum definition file 40a, to move the quantum service 24 to the updated quantum definition file 40b. For example, qubits can be allocated and/or deallocated by modifying various pointers or the like stored in memory such as in the qubit registry 20.

As another example, in response to determining that the quantum phenomena state of the existing quantum definition file 40a comprises an active-phenomena state, the C2Q service 32 can load the updated quantum definition file 40b into the quantum service scheduler 30. The C2Q service 32 can communicate with the quantum service manager 28 to, upon conclusion of the quantum service 24 executing the existing quantum definition file 40a, restart the quantum service 24 with the updated quantum definition file 40b.

As yet another example, in response to determining that the quantum phenomena state of the existing quantum definition file 40a comprises an active-phenomena state, the C2Q service 32 can, prior to conclusion of the quantum service 24 executing the existing quantum definition file 40a, allocate a new set of qubits to the network topology according to the updated quantum definition file 40b. Then, upon conclusion of the quantum service 24 executing the existing quantum definition file 40a, the C2Q service 32 can enable entanglement of the new set of qubits allocated to network topology according to the updated quantum definition file 40b. The entanglement of the new set of qubits can occur immediately upon conclusion of the quantum service 24 executing the existing quantum definition file 40a or may be triggered by a request received from an administrator of the network associated with the configuration file 36. In another example, entanglement of the new set of qubits can occur when the delta from an optimization perspective reaches a threshold.

In addition, the C2Q service 32 can update the mapping table 34 to reflect the one or more additional allocations or the one or more deallocations (e.g., to accurately map between the configuration file 36 and the updated quantum definition file 40b).

In such fashion, the C2Q service 32 can quickly identify and address changes in the configuration file 36 for a dynamically changing network topography. The C2Q service 32 can respond by generating and then causing adherence to an updated quantum definition file 40b.

It is to be understood that, because the C2Q service 32 is a component of the quantum computing device 10, functionality implemented by the C2Q service 32 may be attributed to the quantum computing device 10 generally. Moreover, in examples where the C2Q service 32 comprises software instructions that program the processor device 14 to carry out functionality discussed herein, functionality implemented by the C2Q service 32 may be attributed herein to the processor device 14. It is to be further understood that while, for purposes of illustration only, the C2Q service 32 is depicted as a single component, the functionality implemented by the C2Q service 32 may be implemented in any number of components, and the examples discussed herein are not limited to any particular number of components.

Figure 2A:
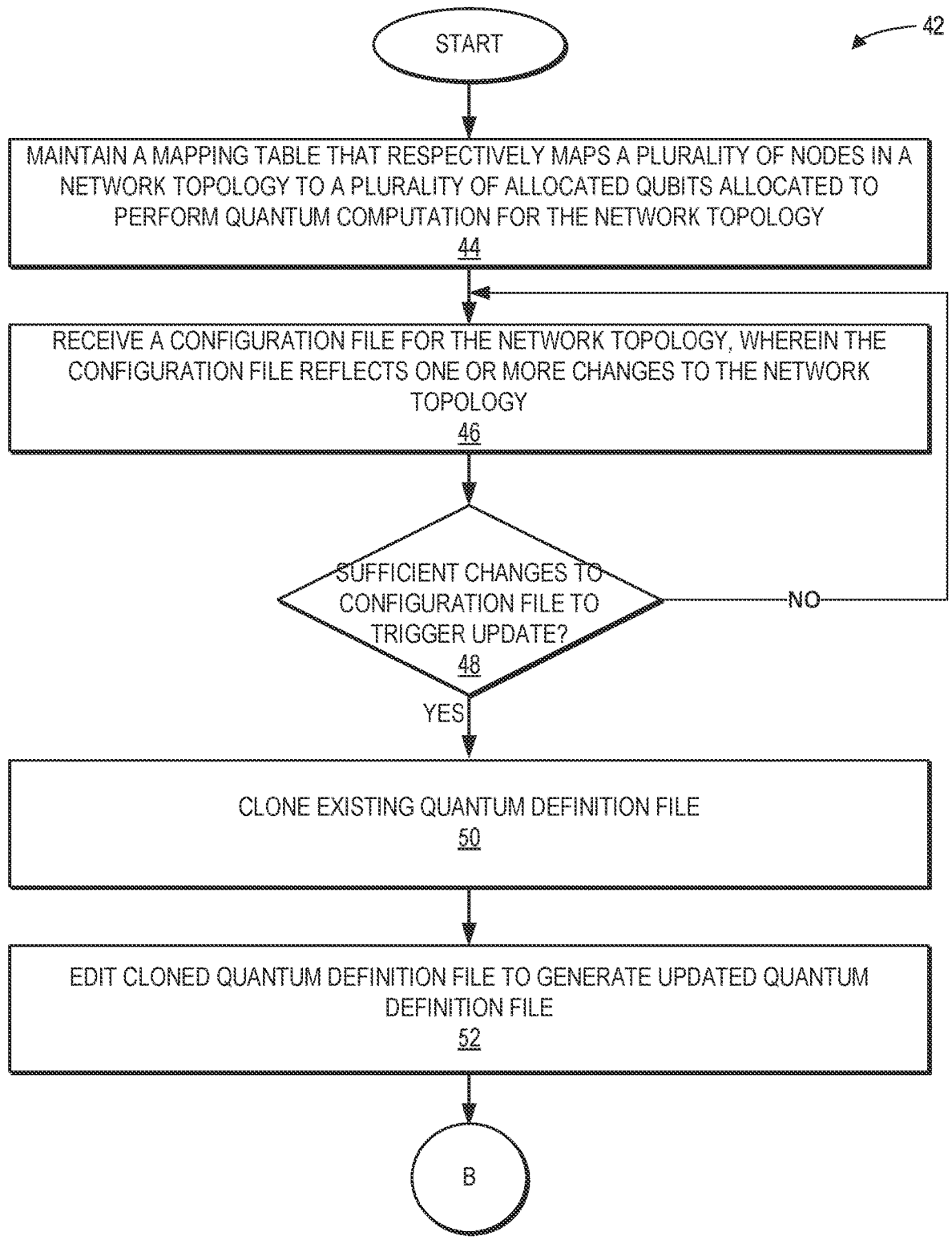
FIGS. 2A and 2B are flowcharts illustrating operations performed by the computing system of FIG. 1 for qubit allocation for dynamic network topographies, according to one example.
Figure 2B:
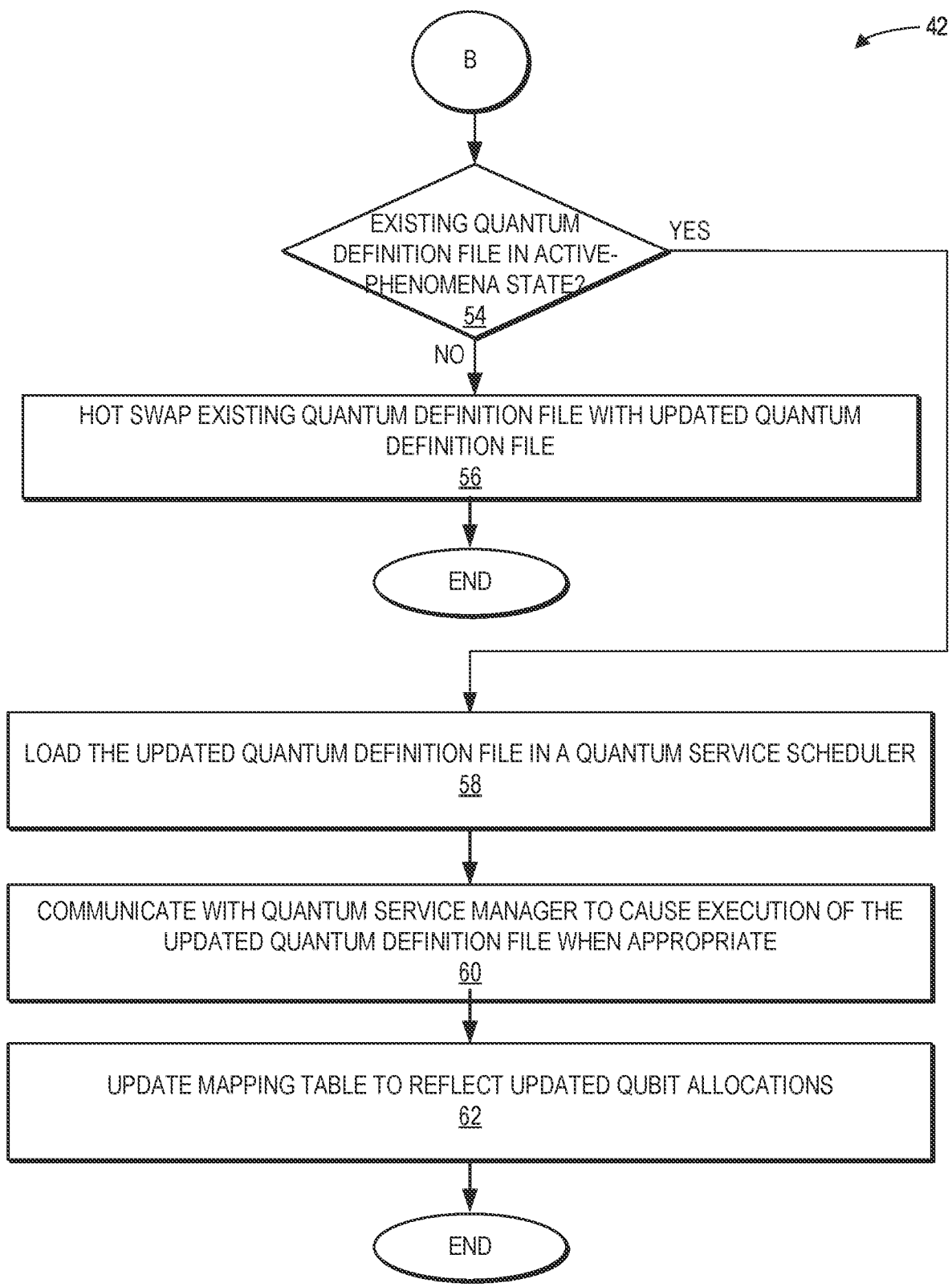

To illustrate exemplary operations performed by the quantum computing device 10 of FIG. 1 for managing runtime qubit allocation for executing quantum services according to one example, FIGS. 2A and 2B provide a flowchart 42. Elements of FIG. 1 are referenced in describing FIGS. 2A and 2B for the sake of clarity. In FIG. 2A, operations begin with a processor device of a computing device, such as the processor device 14 of the quantum computing device 10 of FIG. 1, maintaining a mapping table 34 that respectively maps a plurality of nodes in a network topology to a plurality of allocated qubits that have been allocated to perform quantum computation for the network topology (block 44).

The processor device 14 then receives a configuration file 36 for the network topology, where the configuration file 36 reflects one or more changes to the network topology (block 46). The processor device 14 then determines whether sufficient changes have occurred within the configuration file 36 to trigger an update (block 48). For example, an update may be triggered only when a threshold number of changes have occurred. In other implementations, an update may be triggered upon a single change in the configuration file 36. If it is determined that sufficient changes have not occurred, the flowchart 42 returns to block 46.

However, if is determined at block 48 that sufficient changes have occurred, then processor device 14 clones an existing quantum definition file 40a (block 50). The processor device 14 then edits the cloned quantum definition file to generate an updated quantum definition file 40b (block 52). For example, in some implementations, the processor device 14 can consult the qubit registry 20 and lock down new qubits to allocate and assign to the new nodes. The processor device 14 can also flag qubits that are no longer needed, and the qubit registry 20 can mark them, for example by modifying their metadata, to be safely deallocated at the appropriate time. Having retrieved the appropriate information from the qubit registry 20, the processor device 14 can edit the cloned quantum definition file to contain the appropriate references. For example, the processor device 14 can insert references to new qubits (e.g., their address(es) and metadata from the qubit registry 20) and remove lines associated with qubits that are no longer needed, thereby generating the updated quantum definition file 40b. Operations in some examples may then continue at block 54 of FIG. 2B.

Referring now to FIG. 2B, in some examples, the processor device 14 can determine whether the existing quantum definition file 40a is in an active-phenomena state (block 54). If it is determined that the existing quantum definition file 40a is not in an active-phenomena state (i.e., the existing quantum definition file 40a is in an non-phenomena state), then processor device 14 can hot swap the existing quantum definition file 40a with the updated quantum definition file 40b (block 56).

However, if it is determined that the existing quantum definition file 40a is in an active-phenomena state, then processor device 14 can load the updated quantum definition file 40b in a quantum service scheduler 30 (block 58). In some implementations, the updated quantum definition file 40b may re-use the existing allocated qubits (with some additions or removals). In other implementations, for example when the existing quantum definition file 40a is in an active-phenomena state, the updated quantum definition file 40b may use an entirely new set of qubits. In these examples, initiating the quantum service using an entirely new set of qubits may provide redundancy and/or provide the ability to have a new quantum service with the new qubits completely ready for execution when desired (e.g., as opposed to re-using allocated qubits).

Next, the processor device 14 can communicate with a quantum service manager 28 to cause execution of the updated quantum definition file 40b when appropriate (block 60). For example, the processor device 14 can cause execution of the updated quantum definition file 40b on demand (e.g., by an administrator of the network), upon completion of the existing quantum service, when an error associated with the existing quantum service exceeds a threshold, and/or upon other triggers. Finally, the processor device 14 can update the mapping table 34 to reflect the updated qubit allocations of the updated quantum definition file 40b (block 62).

Figure 3:
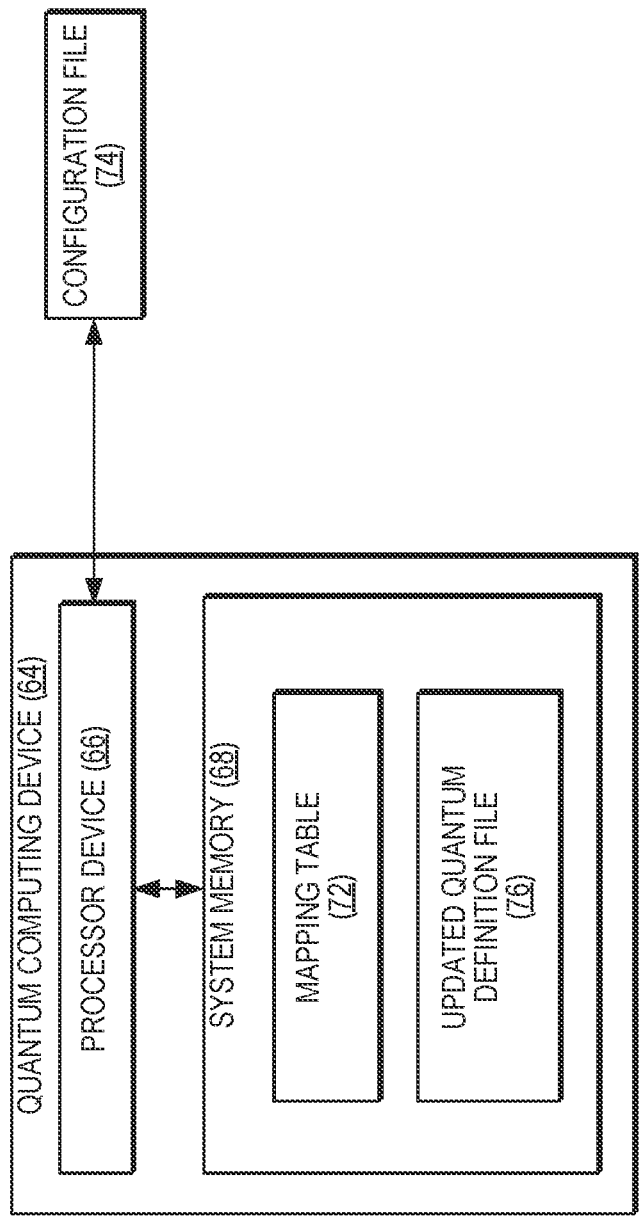
FIG. 3 is a simpler block diagram of the quantum computing device of FIG. 1 for qubit allocation for dynamic network topographies, according to one example.

FIG. 3 is a simpler block diagram of the quantum computing device 10 of FIG. 1 for qubit allocation for dynamic network topographies, according to one example. In the example of FIG. 3, a quantum computing device 64 comprises a system memory 68 and a processor device 66. The system memory stores maintains a mapping table 72 that respectively maps a plurality of nodes in a network topology to a plurality of allocated qubits allocated to perform quantum computation for the network topology. The processor device 66 receives a configuration file 74 for the network topology, wherein the configuration file 74 reflects one or more changes to the network topology. The processor device 66 generates an updated quantum definition file 76 for the network topology based on the configuration file 74 and the mapping table 72. The updated quantum definition file 76 comprises one or more additional allocations of one or more additional qubits or one or more deallocations of one of more of the plurality of allocated qubits. The processor device 66 causes the one or more additional allocations of the one or more additional qubits or the one or more deallocations of the one of more of the plurality of allocated qubits according to the updated quantum definition file 76.

Figure 4:
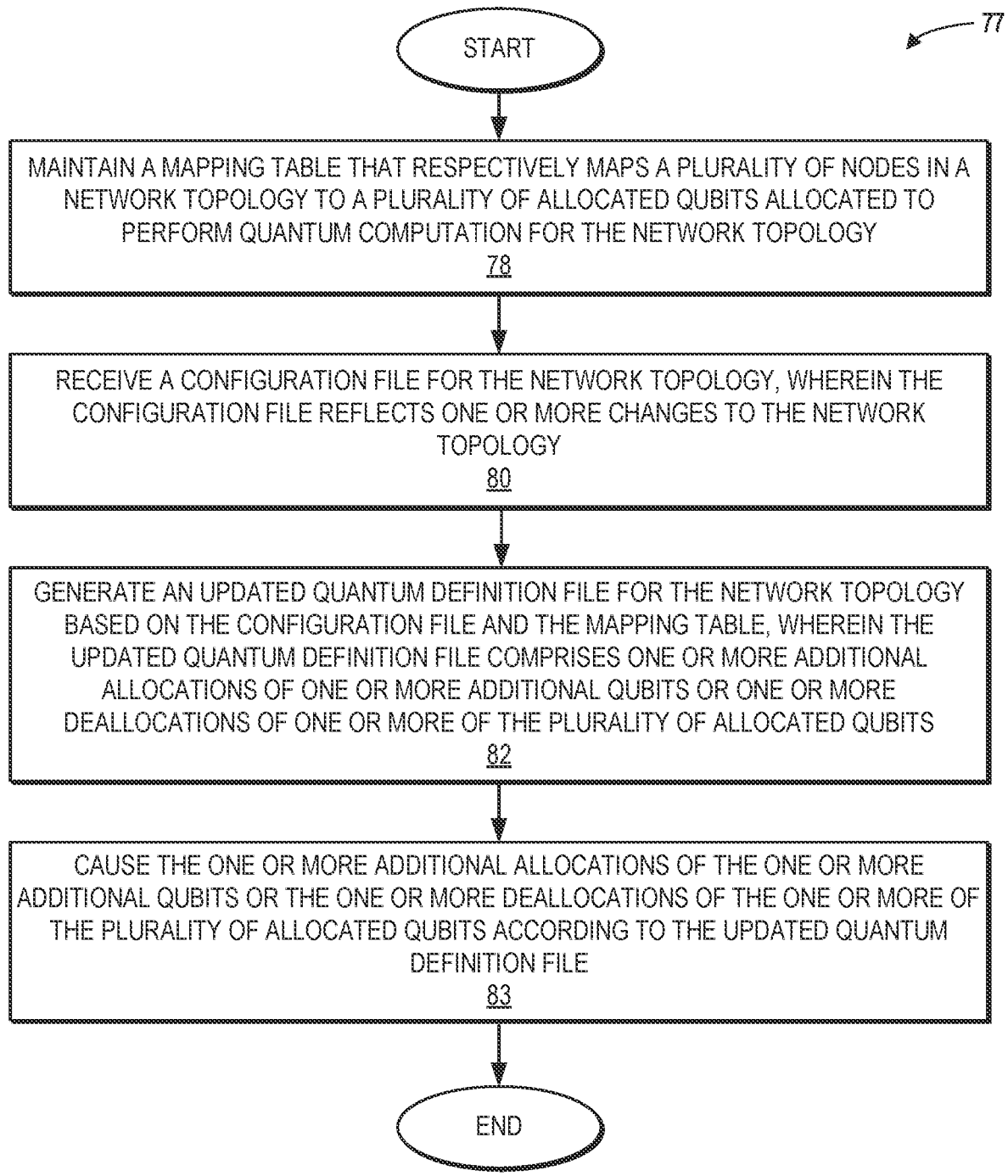
FIG. 4 is a flowchart of a simplified method for qubit allocation for dynamic network topographies by the quantum computing device of FIG. 3, according to one example.

FIG. 4 provides a flowchart 77 of a simplified method for qubit allocation for dynamic network topographies by the quantum computing device 64 of FIG. 3, according to one example. For the sake of clarity, elements of FIG. 3 are referenced in describing FIG. 4. Operations in FIG. 4 begin with the processor device 66 of the quantum computing device 64 maintaining a mapping table 72 that respectively maps a plurality of nodes in a network topology to a plurality of allocated qubits allocated to perform quantum computation for the network topology (block 78). The processor device 66 receives a configuration file 74 for the network topology, wherein the configuration file reflects one or more changes to the network topology (block 80). The processor device 66 generates an updated quantum definition file for the network topology based on the configuration file 74 and the mapping table 72 (block 82). The updated quantum definition file comprises one or more additional allocations of one or more additional qubits or one or more deallocations of one of more of the plurality of allocated qubits. The processor device 66 causes the one or more additional allocations of the one or more additional qubits or the one or more deallocations of the one of more of the plurality of allocated qubits according to the updated quantum definition file 76 (block 83).

Figure 5:
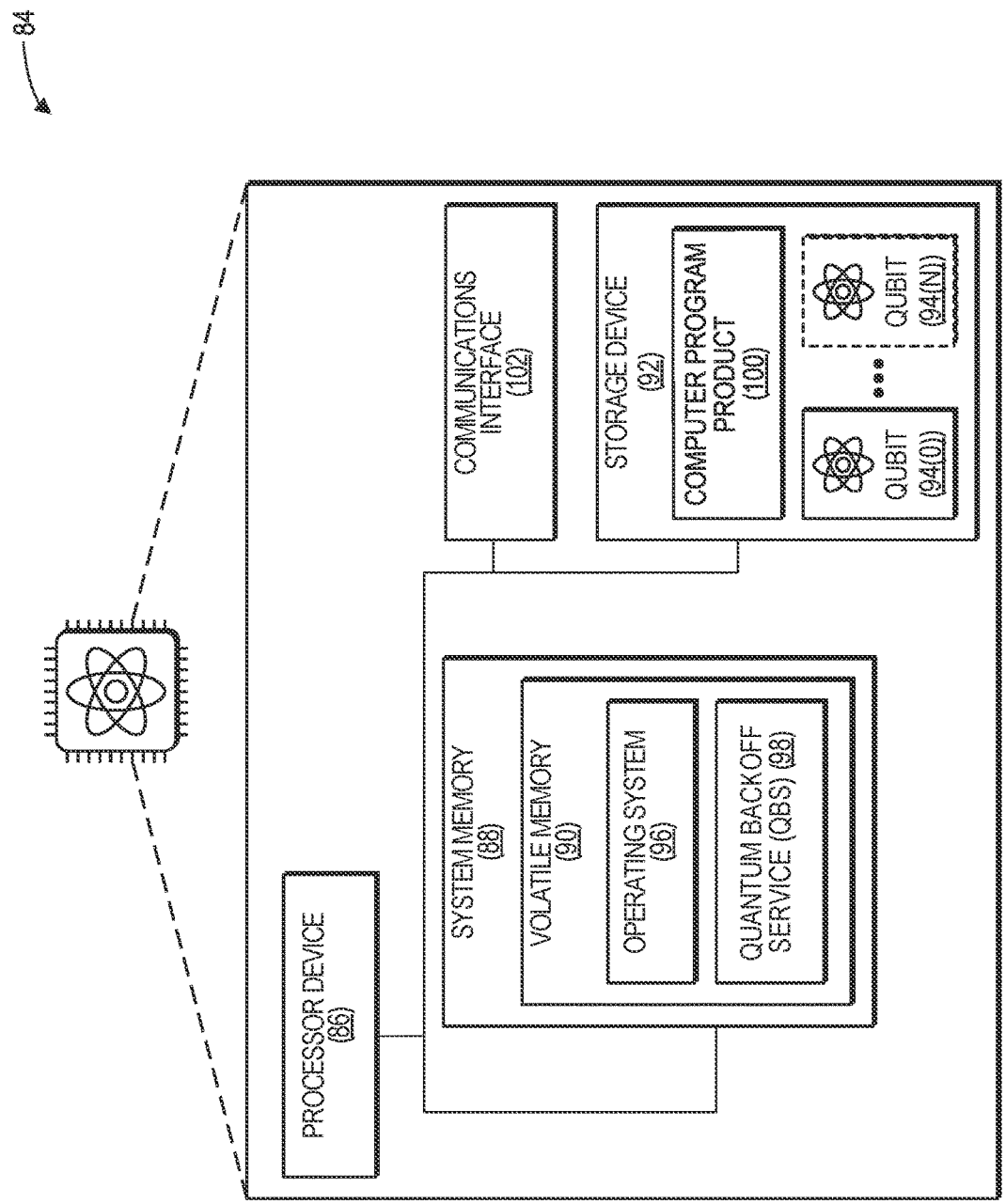
FIG. 5 is a block diagram of a quantum computing device suitable for implementing examples, according to one example.

FIG. 5 is a block diagram of a quantum computing device 84, such as the quantum computing device 10 of FIG. 1, suitable for implementing examples according to one example. The quantum computing device 84 may comprise any suitable quantum computing device or devices. The quantum computing device 84 can operate using classical computing principles or quantum computing principles. When using quantum computing principles, the quantum computing device 84 performs computations that utilize quantum-mechanical phenomena, such as superposition and entanglement. The quantum computing device 84 may operate under certain environmental conditions, such as at or near zero degrees (0°) Kelvin. When using classical computing principles, the quantum computing device 84 utilizes binary digits that have a value of either zero (0) or one (1).

The quantum computing device 84 includes a processor device 86 and a system memory 88. The processor device 86 can be any commercially available or proprietary processor suitable for operating in a quantum environment. The system memory 88 may include volatile memory 90 (e.g., random-access memory (RAM)). The quantum computing device 84 may further include or be coupled to a non-transitory computer-readable medium such as a storage device 92. The storage device 92 and other drives associated with computer-readable media and computer-usable media may provide non-volatile storage of data, data structures, computer-executable instructions, and the like. The storage device may also provide functionality for storing one or more qubits 94(0)-94(N).

A number of modules can be stored in the storage device 92 and in the volatile memory 90, including an operating system 96 and one or more modules, such as a C2Q 98. All or a portion of the examples may be implemented as a computer program product 100 stored on a transitory or non-transitory computer-usable or computer-readable medium, such as the storage device 92, which includes complex programming instructions, such as complex computer-readable program code, to cause the processor device 86 to carry out the steps described herein. Thus, the computer-readable program code can comprise computer-executable instructions for implementing the functionality of the examples described herein when executed on the processor device 86.

An operator may also be able to enter one or more configuration commands through a keyboard (not illustrated), a pointing device such as a mouse (not illustrated), or a touch-sensitive surface such as a display device (not illustrated). The quantum computing device 84 may also include a communications interface 102 suitable for communicating with other quantum computing systems, including, in some implementations, classical computing devices.

Individuals will recognize improvements and modifications to the preferred examples of the disclosure. All such improvements and modifications are considered within the scope of the concepts disclosed herein and the claims that follow.

What is claimed is:
1. A method, comprising:
  maintaining, by a computing device, a mapping table that respectively maps a plurality of nodes in a network topology to a plurality of allocated qubits allocated to perform quantum computation for the network topology;
  receiving, by the computing device, a configuration file for the network topology, wherein the configuration file reflects one or more changes to the network topology;

generating, by the computing device, an updated quantum definition file for the network topology based on the configuration file and the mapping table, wherein the updated quantum definition file comprises one or more additional allocations of one or more additional qubits or one or more deallocations of one of more of the plurality of allocated qubits; and causing, by the computing device, the one or more additional allocations of the one or more additional qubits or the one or more deallocations of the one of more of the plurality of allocated qubits according to the updated quantum definition file.

2. The method of claim 1, wherein:
the one or more changes to the network topology comprise one or more additional nodes added to the network topology; and
the updated quantum definition file comprises the one or more additional allocations of the one or more additional qubits, the one or more additional allocations respectively corresponding to the one or more additional nodes.

3. The method of claim 2, wherein causing the one or more additional allocations comprises communicating with a qubit registry to assign the one or more additional qubits to the network topology.

4. The method of claim 1, wherein:
the one or more changes to the network topology comprise one or more departed nodes departed from the network topology; and
the updated quantum definition file comprises the one or more deallocations of the one of more of the plurality of allocated qubits, the one or more deallocations respectively corresponding to the one or more departed nodes.

5. The method of claim 4, wherein causing the one or more deallocations comprises communicating with a qubit registry to cause the qubit registry to adjust metadata associated with the one of more of the plurality of allocated qubits to mark the one of more of the plurality of allocated qubits for deallocation.

6. The method of claim 1, wherein receiving the configuration file comprises actively monitoring the configuration file to automatically detect the one or more changes to the network topology.

7. The method of claim 1, wherein the updated quantum definition file comprises a Quantum Assembly (QASM) file.

8. The method of claim 1, wherein generating, by the computing device, the updated quantum definition file for the network topology comprises:
cloning an existing quantum definition file for the network topology to generate a cloned quantum definition file; and
editing the cloned quantum definition file to generate the updated quantum definition file.

9. The method of claim 1, wherein causing, by the computing device, the one or more additional allocations or the one or more deallocations comprises:
determining an quantum phenomena state of an existing quantum definition file for the network topology; and
causing the one or more additional allocations or the one or more deallocations based on the quantum phenomena state of the existing quantum definition file.

10. The method of claim 9, wherein causing, by the computing device, the one or more additional allocations or the one or more deallocations further comprises:
responsive to determining that the quantum phenomena state of the existing quantum definition file comprises a non-phenomena state, hot-swapping the existing quantum definition file with the updated quantum definition file.

11. The method of claim 9, wherein causing, by the computing device, the one or more additional allocations or the one or more deallocations further comprises:
responsive to determining that the quantum phenomena state of the existing quantum definition file comprises an active-phenomena state:
loading the updated quantum definition file into a quantum service scheduler; and
communicating with a quantum service manager to, upon conclusion of a quantum service executing the existing quantum definition file, restart the quantum service with the updated quantum definition file.

12. The method of claim 9, wherein causing, by the computing device, the one or more additional allocations or the one or more deallocations further comprises:
responsive to determining that the quantum phenomena state of the existing quantum definition file comprises an active-phenomena state:
prior to conclusion of a quantum service executing the existing quantum definition file, allocating a new set of qubits to the network topology according to the updated quantum definition file; and
upon conclusion of the quantum service executing the existing quantum definition file, enabling entanglement of the new set of qubits allocated to network topology according to the updated quantum definition file.

13. The method of claim 1, further comprising:
updating the mapping table to reflect the one or more additional allocations or the one or more deallocations.

14. The method of claim 1, wherein the network topology comprises an Internet of Things (IoT) network.

15. The method of claim 1, wherein the plurality of allocated qubits perform energy minimization route optimization or combinatorial route analysis for the network topology.

16. A computing device, comprising:
a system memory; and
a processor device communicatively coupled to the system memory, the processor device to:
maintain a mapping table that respectively maps a plurality of nodes in a network topology to a plurality of allocated qubits allocated to perform quantum computation for the network topology;
receive a configuration file for the network topology, wherein the configuration file reflects one or more changes to the network topology;
generate an updated quantum definition file for the network topology based on the configuration file and the mapping table, wherein the updated quantum definition file comprises one or more additional allocations of one or more additional qubits or one or more deallocations of one of more of the plurality of allocated qubits; and
cause the one or more additional allocations of the one or more additional qubits or the one or more deallocations of the one of more of the plurality of allocated qubits according to the updated quantum definition file.

17. The computing device of claim 16, wherein to cause the one or more additional allocations or the one or more deallocations is to:
determine an quantum phenomena state of an existing quantum definition file for the network topology; and cause the one or more additional allocations or the one or more deallocations based on the quantum phenomena state of an existing quantum definition file.

18. The computing device of claim 17, wherein to cause the one or more additional allocations or the one or more deallocations is to:
   in response to determination that the quantum phenomena state of the existing quantum definition file comprises an active-phenomena state:
      load the updated quantum definition file into a quantum service scheduler; and
      communicate with a quantum service manager to, upon conclusion of a quantum service executing the existing quantum definition file, restart the quantum service with the updated quantum definition file.

19. The computing device of claim 17, wherein to cause the one or more additional allocations or the one or more deallocations is to:
   in response to determination that the quantum phenomena state of the existing quantum definition file comprises an active-phenomena state:
      prior to conclusion of a quantum service executing the existing quantum definition file, allocate a new set of qubits to the network topology according to the updated quantum definition file; and
      upon conclusion of the quantum service executing the existing quantum definition file, enable entanglement of the new set of qubits allocated to network topology according to the updated quantum definition file.

20. A non-transitory computer-readable medium having stored thereon computer-executable instructions that, when executed, cause one or more processor devices to:
   maintain a mapping table that respectively maps a plurality of nodes in a network topology to a plurality of allocated qubits allocated to perform quantum computation for the network topology;
   receive a configuration file for the network topology, wherein the configuration file reflects one or more changes to the network topology;
   generate an updated quantum definition file for the network topology based on the configuration file and the mapping table, wherein the updated quantum definition file comprises one or more additional allocations of one or more additional qubits or one or more deallocations of one of more of the plurality of allocated qubits; and
   cause the one or more additional allocations of the one or more additional qubits or the one or more deallocations of the one of more of the plurality of allocated qubits according to the updated quantum definition file.

* * * * *